United States Patent
Evans et al.

(10) Patent No.: US 9,431,882 B2
(45) Date of Patent: Aug. 30, 2016

(54) METHOD FOR PRODUCING A MACHINE COMPONENT FOR AN ELECTRICAL MACHINE, MACHINE COMPONENT AND ELECTRICAL MACHINE

(75) Inventors: Steven Andrew Evans, Buehl (GB); Max Seitter, Muehlacker (DE); Andreas Ewert, Lichtenau (DE); Jan Schlegel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 252 days.

(21) Appl. No.: 14/348,302

(22) PCT Filed: Aug. 2, 2012

(86) PCT No.: PCT/EP2012/065149
§ 371 (c)(1),
(2), (4) Date: Mar. 28, 2014

(87) PCT Pub. No.: WO2013/045142
PCT Pub. Date: Apr. 4, 2013

(65) Prior Publication Data
US 2014/0246947 A1    Sep. 4, 2014

(30) Foreign Application Priority Data
Sep. 30, 2011 (DE) .................. 10 2011 083 917

(51) Int. Cl.
*H02K 15/00* (2006.01)
*H02K 1/02* (2006.01)
(Continued)

(52) U.S. Cl.
CPC ............... *H02K 15/00* (2013.01); *H02K 1/02* (2013.01); *H02K 3/487* (2013.01); *H02K 15/022* (2013.01); *H02K 15/03* (2013.01); *Y10T 29/49009* (2015.01)

(58) Field of Classification Search
CPC ....... H02K 1/02; H02K 3/487; H02K 15/022; H02K 15/03; H02K 15/00; Y10T 29/49009; Y10T 29/49012
USPC ............. 29/596, 598; 219/148; 310/216.001, 310/261.106, 254.1, 216.106; 428/683
See application file for complete search history.

(56) References Cited

U.S. PATENT DOCUMENTS

| 5,684,352 A | 11/1997 | Mita et al. |
| 6,483,221 B1 | 11/2002 | Pawellek et al. |

(Continued)

FOREIGN PATENT DOCUMENTS

| CN | 1169612 A | 1/1998 |
| CN | 101796705 A | 8/2010 |

(Continued)

OTHER PUBLICATIONS

International Search Report for Application No. PCT/EP2012/065149 dated Mar. 26, 2013 (English Translation, 2 pages).

*Primary Examiner* — Donghai D Nguyen
(74) *Attorney, Agent, or Firm* — Michael Best & Friedrich LLP (57) ABSTRACT

The invention relates to a method for producing a machine component (1) for an electrical machine, wherein the machine component (1) is formed with a magnetically conductive material, in which one or more magnetically nonconductive separating regions (4) are provided, wherein the separating region (4) is formed by the introduction of austenite-forming material during a melting process of the magnetically conductive material of the machine component (1), such that an austenitic structure is formed in the magnetically conductive material of the machine component (1).

11 Claims, 6 Drawing Sheets

(51) Int. Cl.
*H02K 3/487* (2006.01)
*H02K 15/02* (2006.01)
*H02K 15/03* (2006.01)

(56) References Cited

U.S. PATENT DOCUMENTS

| | | | |
|---|---|---|---|
| 7,646,129 B2 * | 1/2010 | Evans | H02K 1/02 310/216.106 |
| 2004/0212256 A1 | 10/2004 | Sugishima et al. | |
| 2008/0191578 A1 | 8/2008 | Evans | |
| 2010/0225431 A1 * | 9/2010 | Kadota | H02K 15/03 219/148 |

FOREIGN PATENT DOCUMENTS

| | | |
|---|---|---|
| DE | 10203272 | 7/2003 |
| JP | 10212588 | 8/1998 |
| JP | 2001093717 | 4/2001 |
| JP | 2004343990 | 12/2004 |
| JP | 2006115613 | 4/2006 |
| JP | 2011067027 | 3/2011 |

* cited by examiner

METHOD FOR PRODUCING A MACHINE COMPONENT FOR AN ELECTRICAL MACHINE, MACHINE COMPONENT AND ELECTRICAL MACHINE

BACKGROUND OF THE INVENTION

The invention relates to electrical machines, in particular to the design of machine components with ferromagnetic materials and in particular measures for guiding the magnetic flux.

Electrical machines generally have stators with stator teeth. Stator coils which generate a magnetic field independently of whether they are supplied with current are usually wound around the stator teeth. In order to conduct the magnetic field, the stator is generally of magnetically permeable design, so that the magnetic field is directed in the direction of a rotor of the electrical machine.

In order to make the stator magnetically permeable, it is often formed from stacked electrical laminations. As an alternative, segments of the stator and also complete stators can also be produced with the aid of pulverulent materials. Pulverulent materials are then processed by a finishing method, such as hot-pressing, sintering, MIM and the like for example.

When producing the stators which are provided with stator coils, a compromise has to be found between the ability to produce said stators in a simple manner and good magnetic permeability. The ability to produce said stators is defined, in particular, by the accessibility to slots, that is to say the ability to wind the individual stator teeth or to introduce winding sides between two adjacent stator teeth, and a low level of expenditure on assembly.

For example, accessibility to slots which is good in relation to a full section and good magnetic permeability can be achieved by the stator being constructed with the aid of segment elements or individual segments which have to be joined to form the stator after the stator teeth have been wound. One example of a production method of this kind is that for T-segment stators. However, the joining process is associated with considerable additional expenditure in relation to a non-segmented stator body in this case.

Secondly, as disclosed in document DE 198 42 948, design solutions are available which increase the expenditure on assembly in relation to the full section to an only insignificant extent, but, on account of their structural form, can be constructed only with a system-related magnetic short circuit. As a result, these solutions have a disadvantage in respect of efficiency in relation to full-section or T-segment stators. In particular, provision is made for the stator to be constructed with tooth heads, which are connected to one another, of stator teeth, wherein the tooth heads are connected to one another by means of webs of reduced cross section.

Document DE 10 2005 004 565 discloses a method for constructing a stator with a two-state steel with a high relative permeability. In order to achieve a low magnetic permeability (low relative permeability) between the tooth heads of adjacent stator teeth, provision is made to subject webs by which the tooth heads are connected to one another to a heat treatment, so that sections with a low relative permeability are produced there. As a result, the magnetic permeability in these sections is considerably reduced.

Document U.S. Pat. No. 5,684,352 discloses rotor designs which have ferromagnetic zones of the stator for flux guidance and magnetically impermeable zones of the stator for flux separation, so that a stray magnetic flux is reduced.

The magnetically impermeable zones in the stator are formed, for example, by melting the stator material and by adding austenite-forming elements to the melt.

The object of the present invention is to provide a method for producing a machine component for an electrical machine which can be produced in a simple manner and has good properties in respect of magnetic flux guidance.

SUMMARY OF THE INVENTION

This object is achieved by the method for producing a machine component for an electrical machine and by the machine component and the electrical machine according to the invention.

According to a first aspect, a method for producing a machine component for an electrical machine is provided, wherein the machine component is formed with a magnetically permeable material in which one or more magnetically impermeable separating regions are provided, wherein the separating region is formed by introducing austenite-forming material during a melting process of the magnetically permeable material of the machine component, so that an austenitic structure is formed in the magnetically permeable material of the machine component.

One idea of the above method involves providing a magnetically permeable material of a machine component by melting and introducing an austenite-forming material with magnetically impermeable separating regions which are provided for preventing magnetic short circuits in the machine component.

Provision can further be made for the austenite-forming material to be introduced by applying a doping element to or in the separating region during or before the melting process of the magnetically permeable material of the machine component, wherein the doping element contains one or more substances which form an austenitic structure in the separating region during the melting process of the magnetically permeable material of the machine component.

According to a further embodiment, the doping element which is applied to the separating region is in the form of a strip, in the form of a tape, in the form of a wire or in the form of a powder.

In particular, the doping element can be applied in or to a boundary region between opposite edges of the machine component, wherein the edges are connected to one another by the melting process and the austenite-forming material of the doping element forms the austenitic structure with the magnetically permeable material of the machine component.

One idea of the above method involves providing a reliable connection of edges of a machine component, with the connection having a low level of or no magnetic permeability. Melting the material of the machine component and adding austenite-forming material can firstly produce a metallically robust connection between the edges and secondly ensure that the connection is magnetically impermeable.

According to a further embodiment, the machine component can correspond to a stator with stator teeth or to a rotor with rotor poles for a rotary electrical machine, wherein the separating regions are each provided between two stator teeth or between two rotor poles.

Provision can further be made for the separating region to extend in a skewed manner in relation to an axial direction of the electrical machine. As a result, particularly by virtue of melting the machine component in the separating regions which are intended to be magnetically impermeable, connections between the component teeth or poles are skewed, wherein the skewing of the magnetic separation is achieved without skewing the individual component teeth or poles. As a result, the development of noise in the electrical machine can be improved without a complex skewed winding being required. In particular, the skewing of the profile of the separating region in relation to the axial direction can change once or several times, wherein in the event of the skewing changing several times, sections of the separating region can also run parallel in relation to the axial direction.

According to a further aspect, a machine component for an electrical machine, in particular a stator or a rotor, is provided, said machine component being produced in line with the above method.

BRIEF DESCRIPTION OF THE DRAWINGS

Preferred embodiments of the present invention will be explained in greater detail below with reference to the appended drawings, in which.

DETAILED DESCRIPTION

Figure 1:
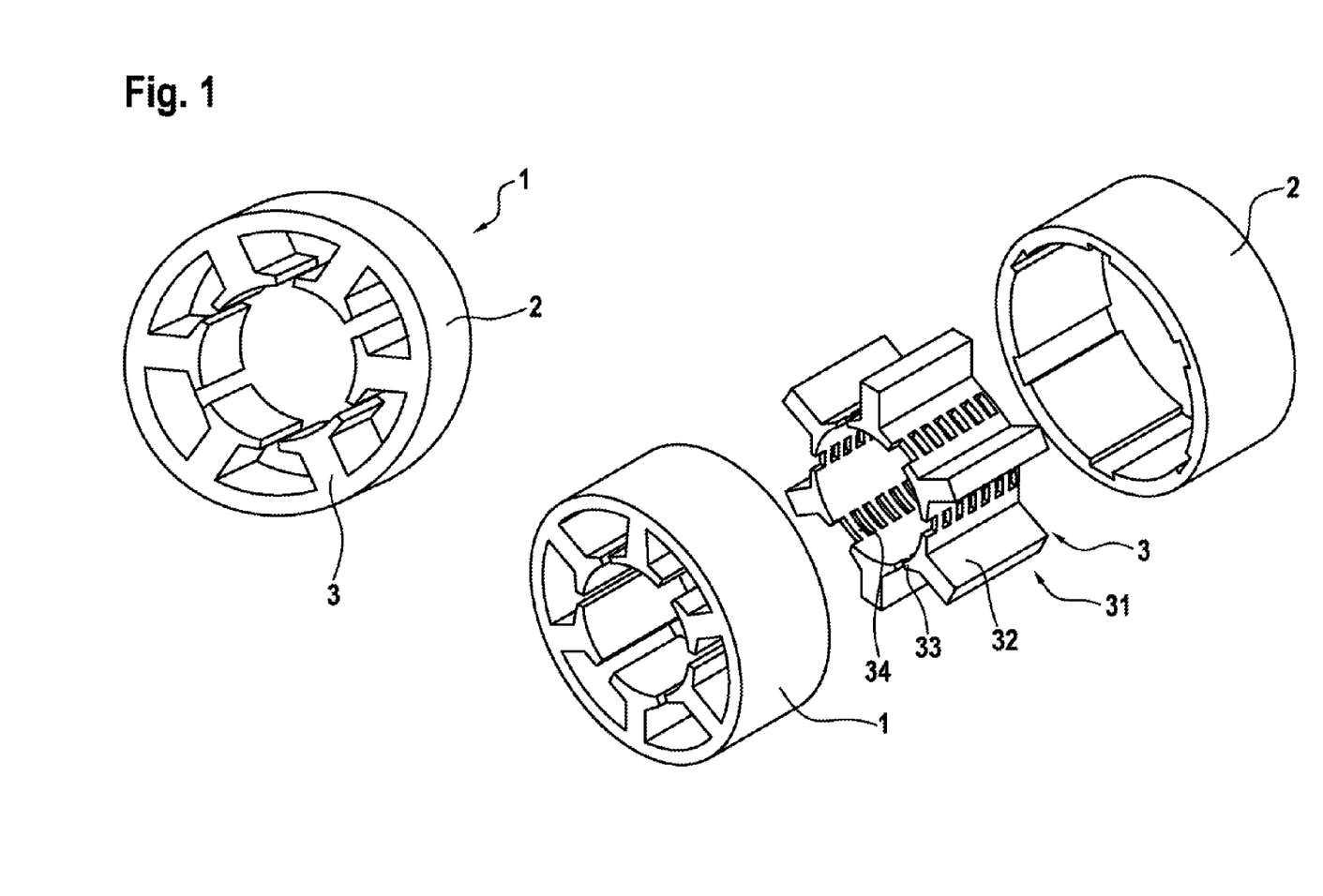
FIG. 1 shows a method for producing a stator for an electrical machine by joining stator teeth in an annular body.

FIG. 1 schematically shows an exploded illustration of a stator 1 for an electrical machine, and also a perspective illustration of the stator 1. The stator 1 is assembled by joining a stator ring 2 and a tooth arrangement 3.

The tooth arrangement 3 has individual stator teeth 31 which are adjacent to one another in a circumferential direction and each have a tooth body 32 and a tooth head 33. The tooth heads 33 define an inner recess in which a rotor (not shown) of the electrical machine can be accommodated. The adjacent tooth heads 33 can be connected to one another over the entire axial length or only by means of individual webs 34 with corresponding interposed recesses, so that the tooth arrangement 3 can be handled substantially as a single component. In alternative embodiments, provision can also be made for the individual stator teeth 31 to be produced separately from one another and not to be connected to one another in the tooth arrangement 3.

The stator 1 can be formed by joining the tooth arrangement 3 to the stator ring 2 by incorporation. The stator teeth 31 are usually wound before the tooth arrangement 3 is inserted into the stator ring 2. In this case, the stator winding can be applied to the respective stator body 32 from the outside.

In order to stabilize the stator 1 against mechanical stresses, in particular also on account of thermal expansions, it is expedient for the stator teeth 31 to be connected to one another at their end which is remote from the stator ring 2, that is to say at their tooth heads 33, so that a relative movement of the tooth heads 33 in the circumferential direction, that is to say in the direction of an adjacent tooth head 33, can be largely suppressed. It is therefore proposed to connect the tooth edges 36 of the tooth heads 33, which tooth edges are directed toward one another, by welding or melting along an axial direction of the stator 1.

Figure 2:
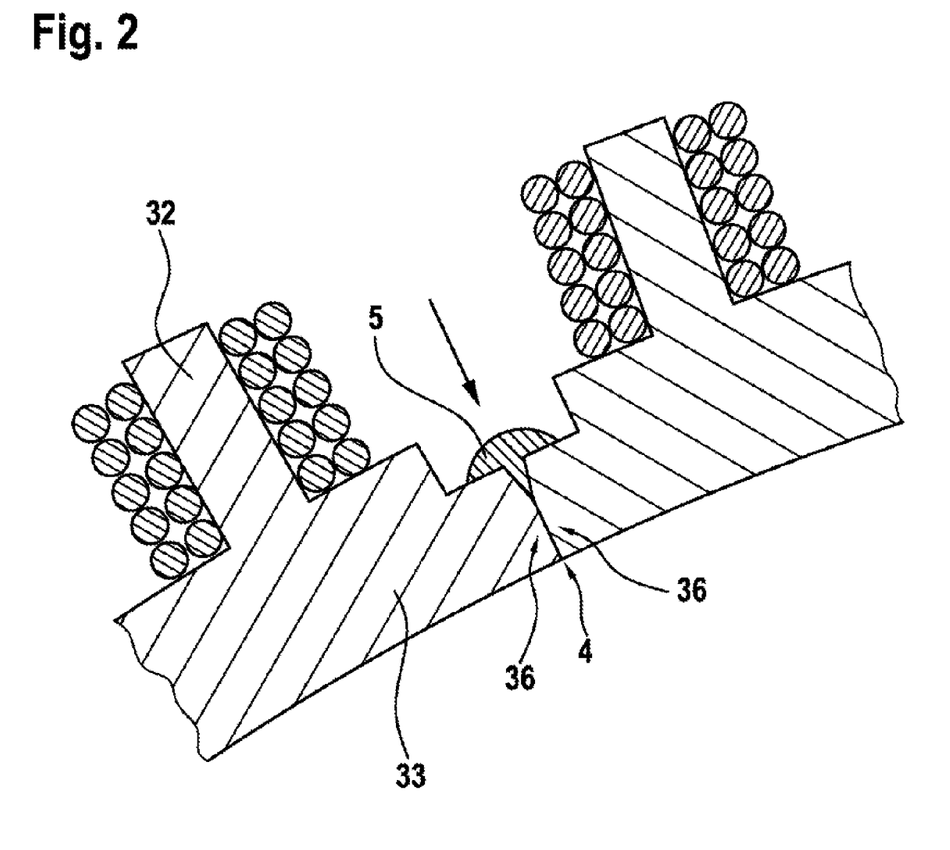
FIG. 2 shows an illustrative representation of the application of a tape composed of austenite-forming material to a boundary point between two stator segments.

To this end, as illustrated in FIG. 2, a doping element 5 which is composed of austenite-forming material is applied to a separating region 4 between or at the tooth edges 36 of two adjacent tooth segments of the tooth arrangement 3, that is to say at the boundary point between the adjacent tooth heads 33 or in the region in which the tooth edges 36 meet, and melted in a welding process or melting process.

The austenite-forming material is applied over the entire axial length of the stator 1 or in several successive sections. The austenite-forming material can therefore be in the form of a doping element 5 and, for example, be in the form of a tape, in the form of a strip, in the form of a wire or in the form of a rod. As an alternative, the austenite-forming material can also be applied as a powder before or during melting. The application of a strip-like doping element 5 to a boundary point is illustrated in cross section in FIG. 3b as an example.

Melting can be carried out with the aid of a method which is known from welding technology, for example with the aid of a laser beam, plasma or electric arc.

The doping element 5 which is composed of austenite-forming material has a composition of which the shape and quantity is such that, when it is applied to the region which is intended to be melted, the separating region 4 is formed with an alloy of the material of the stator 1 and the material of the element, so that an austenitic structure is produced for all temperatures which occur during manufacture, downtime or operation of the electrical machine.

An austenitic structure is preferred since it is not ferromagnetic and therefore is substantially or entirely magnetically impermeable. Materials for the element which is to be incorporated by melting can have a high content of, for example, nickel, manganese and/or copper of more than 80%. The effect for forming the austenitic structure can be increased by an additional content of carbon and/or chromium. The remelted separating region in the stator 1 preferably comprises the following proportions: 0 to 25% of nickel, 0 to 25% of manganese, 0 to 10% of copper, 0 to 1% of carbon and 0 to 25% of chromium.

Melting is usually performed by guiding a corresponding welding apparatus along the axial direction over the doping element 5 which is to be melted or along the boundary region between the adjacent tooth edges 36, so that a region between the tooth heads 33 of the stator 1 is fully melted and an alloy is formed with the material of the doping element 5 which is to be melted.

Whereas the tooth heads 33 are already connected to one another by webs 34 in the embodiment illustrated in FIG. 1 when the melting takes place, in a further embodiment the tooth arrangement 3 can be constructed from individual segments and the tooth heads 33 can each have a width in the circumferential direction, so that the tooth edges 36 of adjacent tooth heads 33 bear against one another or are at an only small distance from one another. Therefore, owing to the subsequent melting process of the tooth edges 36, a cohesive connection between adjacent tooth heads 33 and also a separation region which is magnetically impermeable can be produced at the same time for introducing the austenite-forming material, so that a magnetic short circuit cannot be produced there. The connection between the tooth heads 33 allows an improved mechanical stability of the stator 1.

Figure 3:
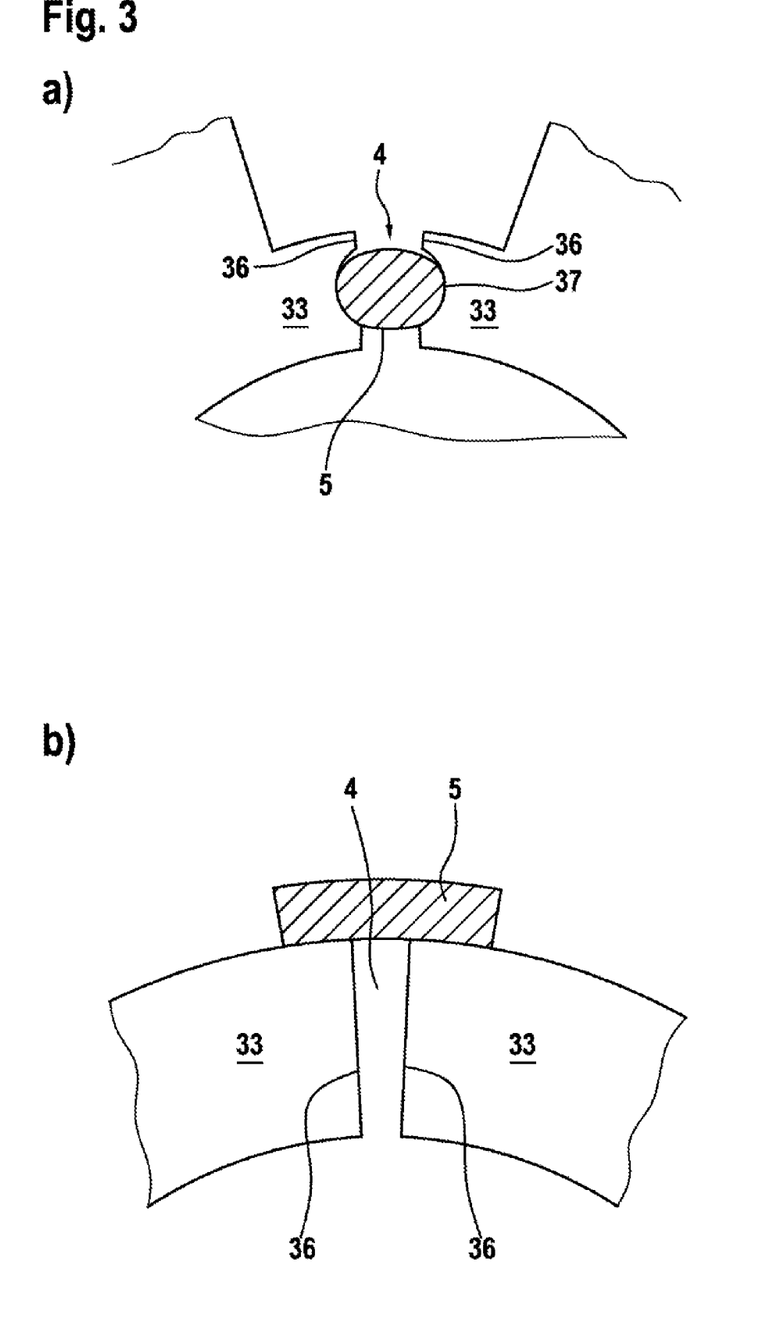
FIGS. 3a and 3b show variants for applying the austenite-forming material in the axial direction by inserting wire or applying a tape prior to melting.

When joining individual tooth segments, which are initially not connected to one another, to form the tooth arrangement 3, a doping element 5 which is to be melted can be inserted between the tooth heads 33, as illustrated in the drawing of FIG. 3a by way of example. To this end, the tooth edges 36 of the tooth heads 33 have recesses 37, so that a receptacle for a wire-like doping element 5 is formed. As a result, it is possible to carry out melting, after joining the tooth segments to form the tooth arrangement 3, without the doping element 5 having been previously applied, and in particular this embodiment ensures the reliable positioning of the doping element 5, which is to be melted, in the boundary region between the tooth edges 36.

Figure 4A:
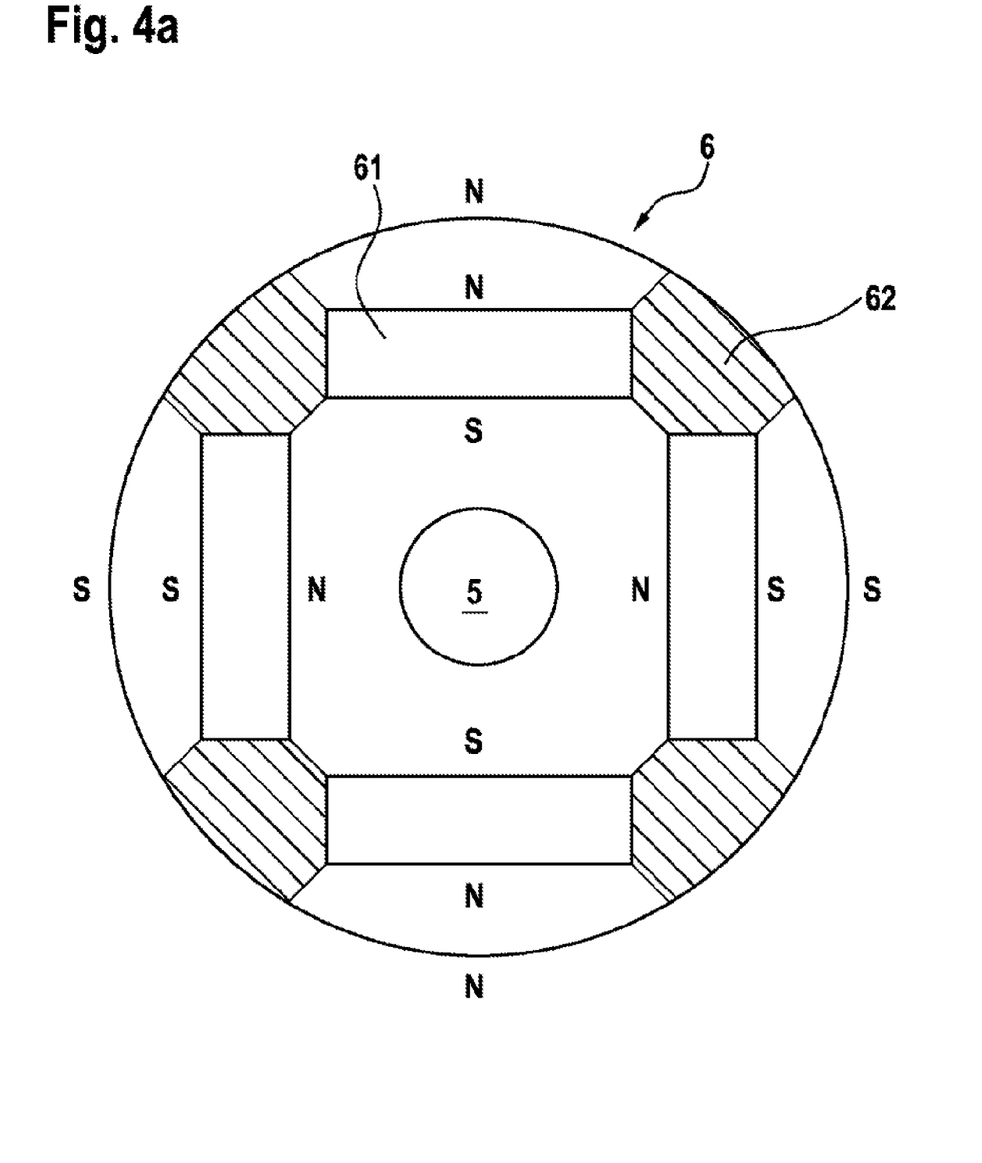
FIGS. 4a to 4c show options for providing magnetically impermeable regions in a stator body by applying austenite-forming material in the axial direction prior to remelting.
Figure 4B:
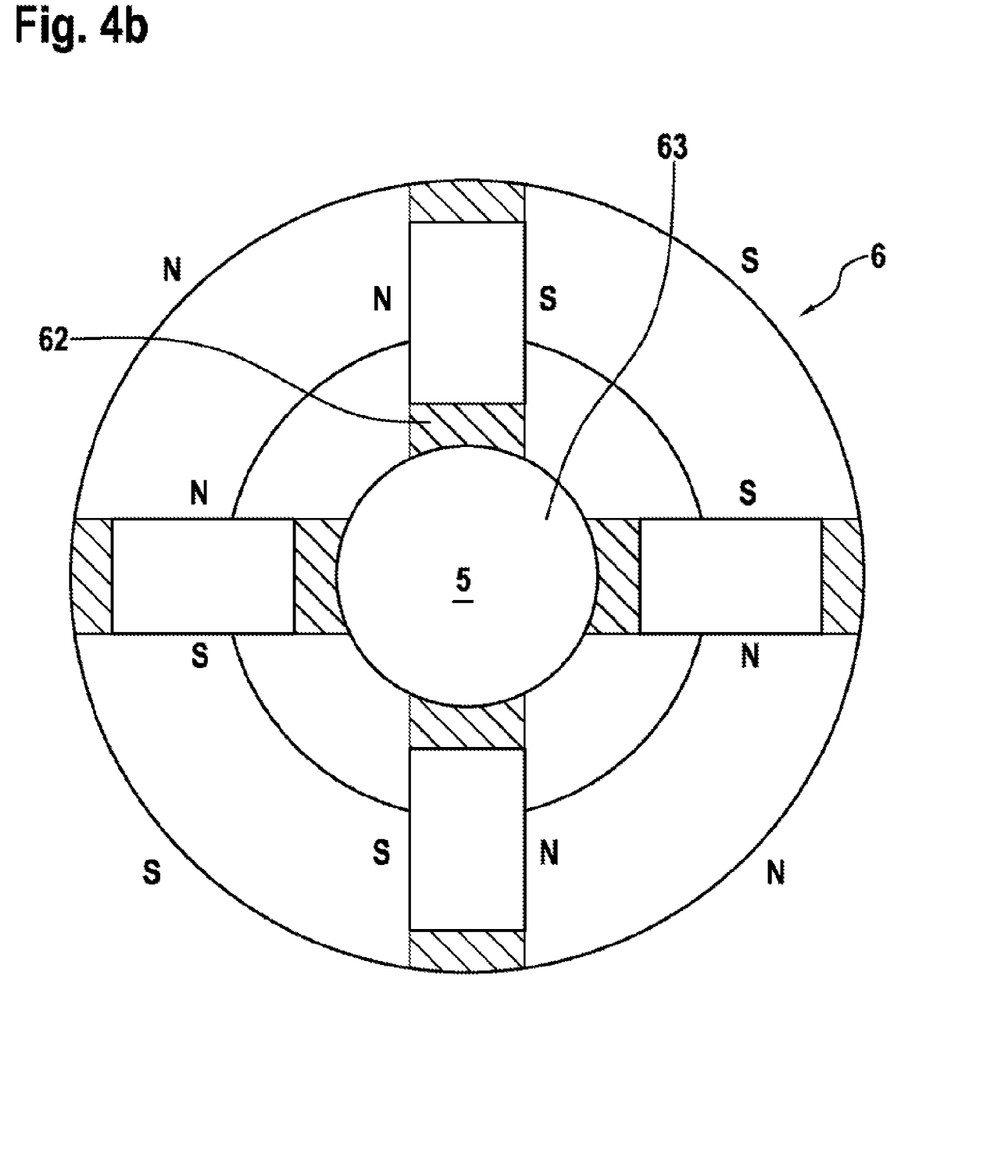
Figure 4C:
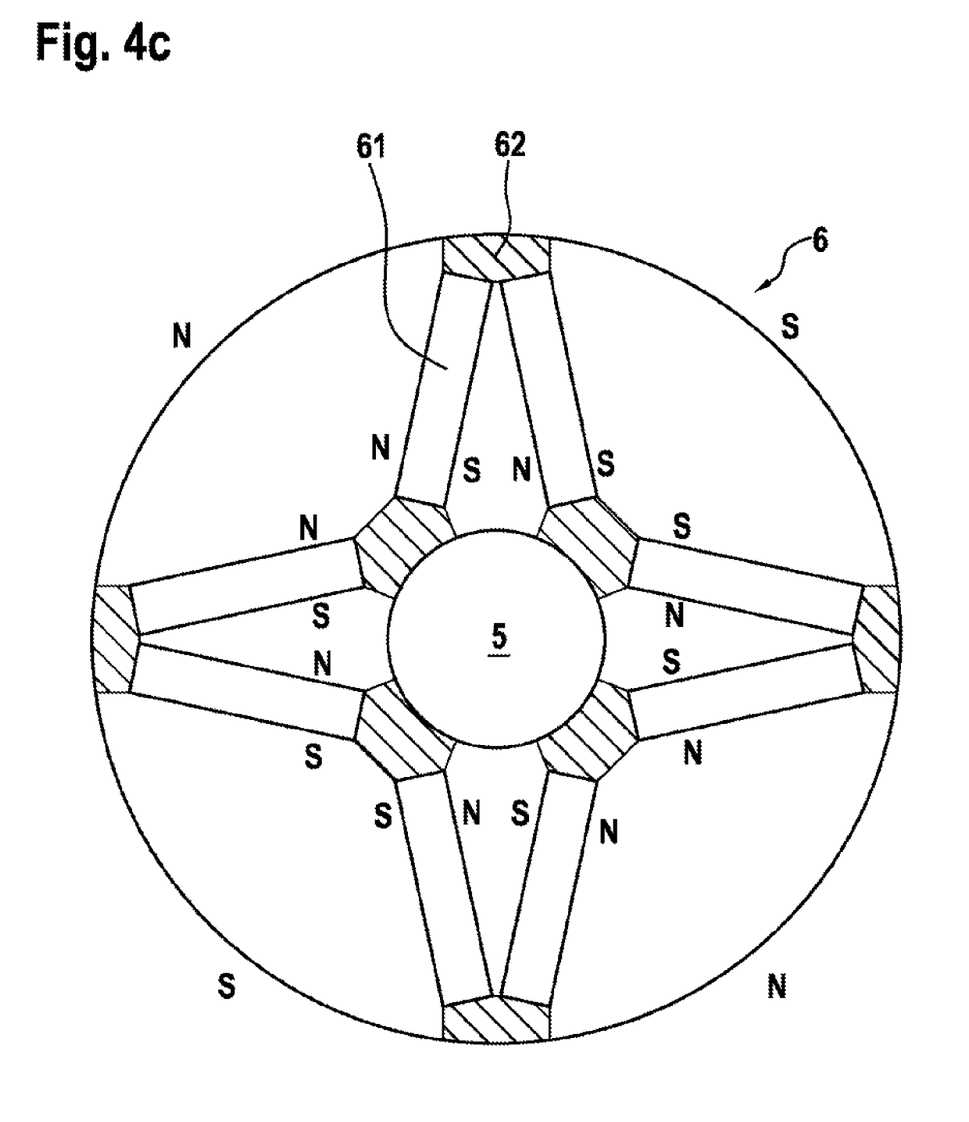

In the drawings of FIGS. 4a to 4c, rotor arrangements 6 are shown as machine components. The rotor arrangements each have pockets 61 for accommodating permanent magnets in order to form rotor poles. In order to prevent magnetic short circuits, separating regions 62 are provided between the pockets 61, said separating regions being produced in a similar manner by applying a doping element 5, which is to be melted, along a region in the axial direction and by subsequently melting or remelting the separating region 62. For the rotor 6, this can be carried out starting from an outer face of the rotor 6 or from an inner face in a shaft recess 63.

In the above-described machine components, the separating regions 62 can also be provided between the tooth heads 33 in a skewed manner in relation to the axial direction in order to provide pseudo-skewing of the stator teeth 31 in the case of the stator 1, or to provide pseudo-skewing of the rotor poles in the case of the rotor arrangement 6. This is advantageous since no deformation of the tooth geometry is necessary, but rather it is necessary only for the projection of the tooth heads 33 to be provided by the skewed provision of the separating region 62.

What is claimed is:

1. A method for producing a machine component (1) for an electrical machine, the method comprising
   forming the machine component (1) with a magnetically permeable material in which one or more magnetically impermeable separating regions (4) are provided,
   wherein the one or more separating regions (4) are formed by introducing a doping material (5) onto the magnetically permeable material, the doping material (5) having an austenite-forming material, wherein the doping material (5) is introduced during a melting process of the magnetically permeable material of the machine component (1), so that an austenitic structure is formed in the magnetically permeable material of the machine component (1);
   wherein the one or more separating regions (4) each includes opposite edges (36) of the machine component (1), the edges (36) spaced along a circumferential direction, wherein the edges (36) are connected to one another solely by the doping material (5).

2. The method as claimed in claim 1, wherein the doping element (5) which is applied to the one or more separating regions (4) is in the form of one of a strip, a tape, a wire or a powder.

3. The method as claimed in claim 1, wherein the machine component (1) is a stator with stator teeth (31) for a rotary electrical machine, wherein the one or more separating regions (4) are each provided between two stator teeth (31).

4. The method as claimed in claim 3, wherein one of the one or more separating regions (4) extends in a skewed manner in relation to an axial direction of the electrical machine.

5. The method as claimed in claim 4, wherein the separating region (4) has a plurality of sections with skews which differ from the axial direction of the electrical machine.

6. The method as claimed in claim 3, wherein the edges (36) are edges of tooth heads (33) of the stator teeth (31).

7. The method as claimed in claim 6, wherein the tooth heads (33) extend from tooth bodies (32), wherein the tooth heads (33) are wider than the tooth bodies (32) along a circumferential direction.

8. The method as claimed in claim 6, wherein the tooth heads (33) are spaced from one another along a circumferential direction.

9. The method as claimed in claim 3, wherein first portions of the edges (36) abut one another and second portions of the edges (36) are spaced from one another by a gap, and wherein the doping element (5) is applied into the gap to connect the edges (36).

10. The method as claimed in claim 3, wherein the edges (36) are spaced from one another at all points by a gap, and wherein the doping element (5) is applied into the gap to connect the edges (36).

11. The method as claimed in claim 3, wherein the edges (36) are spaced from one another at all points by a gap, and wherein the doping element (5) is applied adjacent to the gap to connect the edges (36).

* * * * *